United States Patent
Dunham

Patent Number: 6,146,032
Date of Patent: Nov. 14, 2000

[54] REFRACTIVE OVERLAMINATE PANEL TECHNIQUE

[75] Inventor: Matthew K. Dunham, Eagan, Minn.

[73] Assignee: Fargo Electronics, Inc., Eden Prairie, Minn.

[21] Appl. No.: 09/298,295

[22] Filed: Apr. 23, 1999

Related U.S. Application Data

[60] Provisional application No. 60/083,002, Apr. 24, 1998.

[51] Int. Cl.[7] .................................................. B41J 2/315
[52] U.S. Cl. ...................................................... 400/120.18
[58] Field of Search ....................... 400/120.18; 156/182; 503/227

[56] References Cited

U.S. PATENT DOCUMENTS

| | | | |
|---|---|---|---|
| 4,711,690 | 12/1987 | Haghiri-Tehrani | 156/309.6 |
| 4,856,857 | 8/1989 | Takeuchi et al. | 350/3.6 |
| 5,138,604 | 8/1992 | Umeda et al | 369/103 |
| 5,254,525 | 10/1993 | Nakajima et al. | 503/227 |
| 5,380,695 | 1/1995 | Chiang et al. | 503/227 |
| 5,451,560 | 9/1995 | Akada et al. | 503/227 |
| 5,522,623 | 6/1996 | Soules et al. | 283/91 |
| 5,575,877 | 11/1996 | Hale et al. | 156/240 |
| 5,673,076 | 9/1997 | Nardone et al. | 347/171 |
| 5,743,981 | 4/1998 | Lu | 156/182 |
| 5,888,424 | 3/1999 | Ebnesajjad et al. | 252/301.5 |

*Primary Examiner*—John S. Hilten
*Assistant Examiner*—Charles H. Nolan, Jr.
*Attorney, Agent, or Firm*—Westman, Champlin & Kelly, P.A.

[57] ABSTRACT

A method for printing an identification card includes printing an image on a surface of the identification card and depositing a first overlayer onto the surface of the identification card. Ridges are created in the first overlayer. A second overlaminate layer is deposited over the first overlayer. The second overlaminate layer includes ridges created by the ridges in the first overlayer such that the ridges create a visible pattern on the identification card.

16 Claims, 6 Drawing Sheets

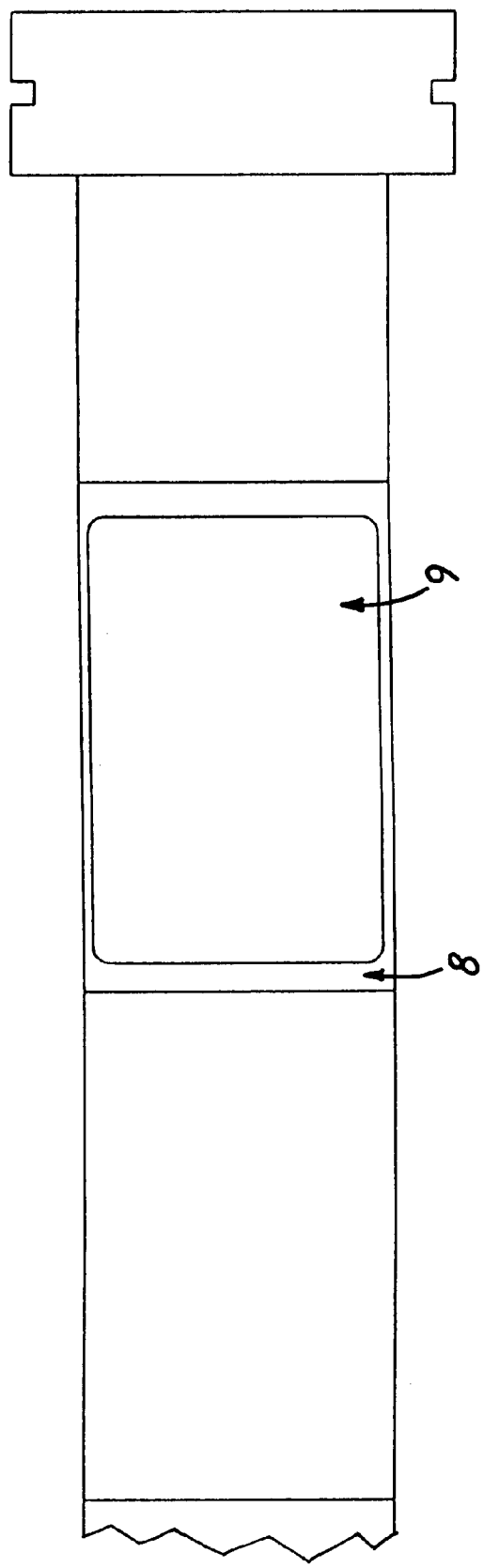

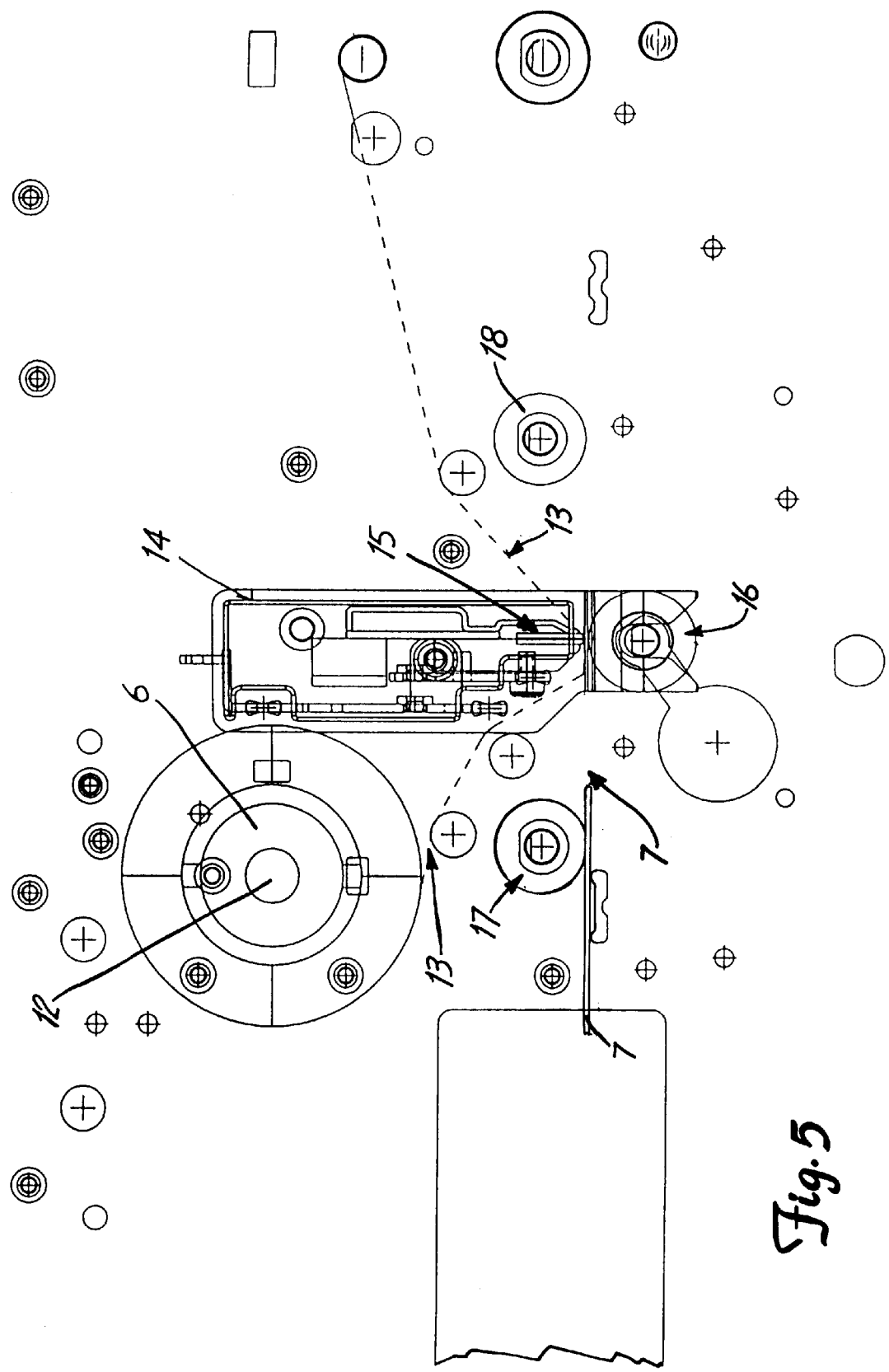

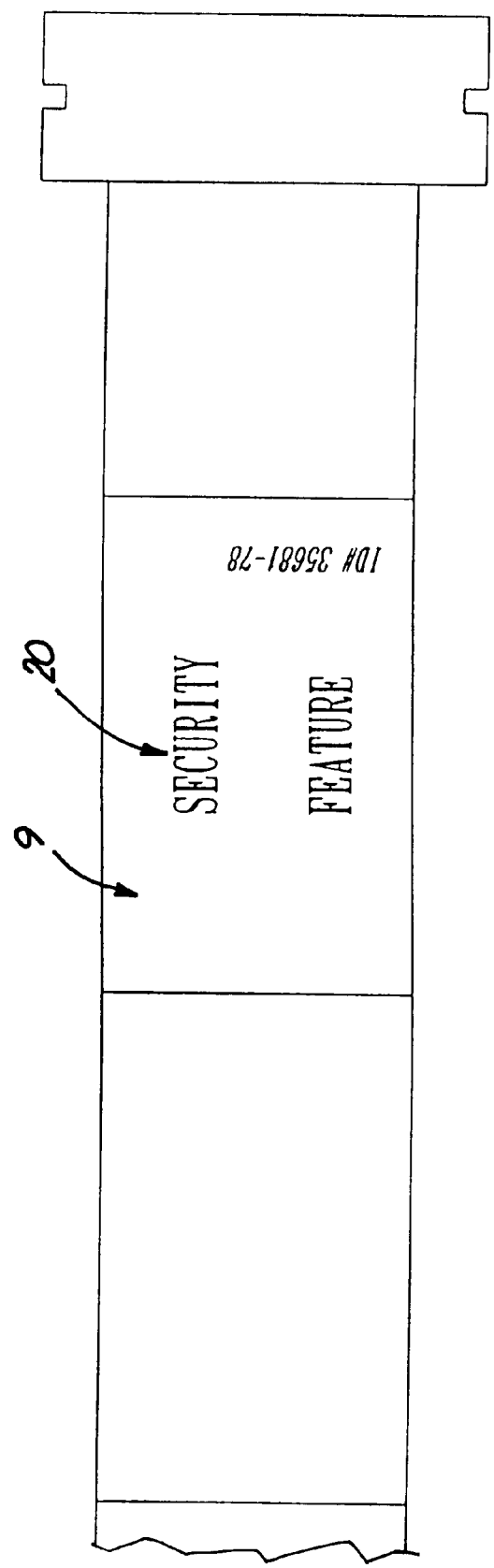

REFRACTIVE OVERLAMINATE PANEL TECHNIQUE

BACKGROUND OF THE INVENTION

The present invention claims priority to Provisional Application Ser. No. 60/083,002, filed Apr. 24, 1998 and entitled REFRACTIVE OVERLAMINATE PANEL TECHNIQUE.

The present invention relates to identification card printers. More specifically, the present invention relates to the formation of images through refractive patterns on identification cards.

Identification card printers traditionally utilize thermal transfer technology to print on hard surfaced polyester sandwich, ABS, or poly vinyl chloride identification cards. Current ribbon technology requires the identification card to be printed with dye sublimation and/or resin panels situated in a Yellow, Magenta, Cyan, Black (YMCK) format. Protection for the identification card can be added using a very thin overlaminate included in the ribbon in a Yellow, Magenta, Cyan, Black, Overlaminate (YMCKO) format. Further protection for the identification card can be applied using a thicker overlaminate which is applied to the card in a separate lamination process. These overlaminates are thicker and more durable.

A holographic type image or other optically variable image may be placed in the separate overlaminate to make the card less subject to counterfeiting. This technology requires an additional step, that of laminating the overlaminate to the card separately from the printing process. The current technology required to place a holographic type image into the overlaminate is unreliable, making for long delays in production and often not laminating securely onto the identification cards. Many companies want the hologram located on the overlaminate so that the hologram can be specifically located at a precise point on the identification card. However, the technology is not readily workable, resulting in large quantities of wasted product. If a customer of identification cards relies on the holographic image for part of its security features in the identification cards, the rolls of overlaminate present a security risk in themselves because the rolls can be stolen, or a portion of the roll can be unwound and cut without knowledge of the theft, or scraps of the rolls can be gathered and utilized.

The holographic overlaminates can have additional security features contained within the holographic image such as smaller holographs not visible with the naked eye or only visible by fluorescing with an ultra violet (UV) light source. These additional safety features do increase security, but they also increase the cost of the overlaminates, increase the difficulty in manufacturing, and take longer to prepare.

SUMMARY OF THE INVENTION

A method and apparatus for printing an identification card, includes printing an image on a surface of the identification card, depositing a first overlayer on the surface of the identification card and creating ridges in the first overlayer. The ridges in the first overlayer create a visible pattern on the identification card.

BRIEF DESCRIPTION OF THE DRAWINGS

FIG. 3 is a plan view showing an overlaminate layer carried on a ribbon.

FIG. 5 is a cross-sectional view showing the path of an identification card and a ribbon through a printer in accordance with the present invention.

FIG. 6 is a top plan view of a ribbon carrying a security feature in accordance with another aspect of the present invention.

DETAILED DESCRIPTION OF THE PREFERRED EMBODIMENTS

Figure 1:
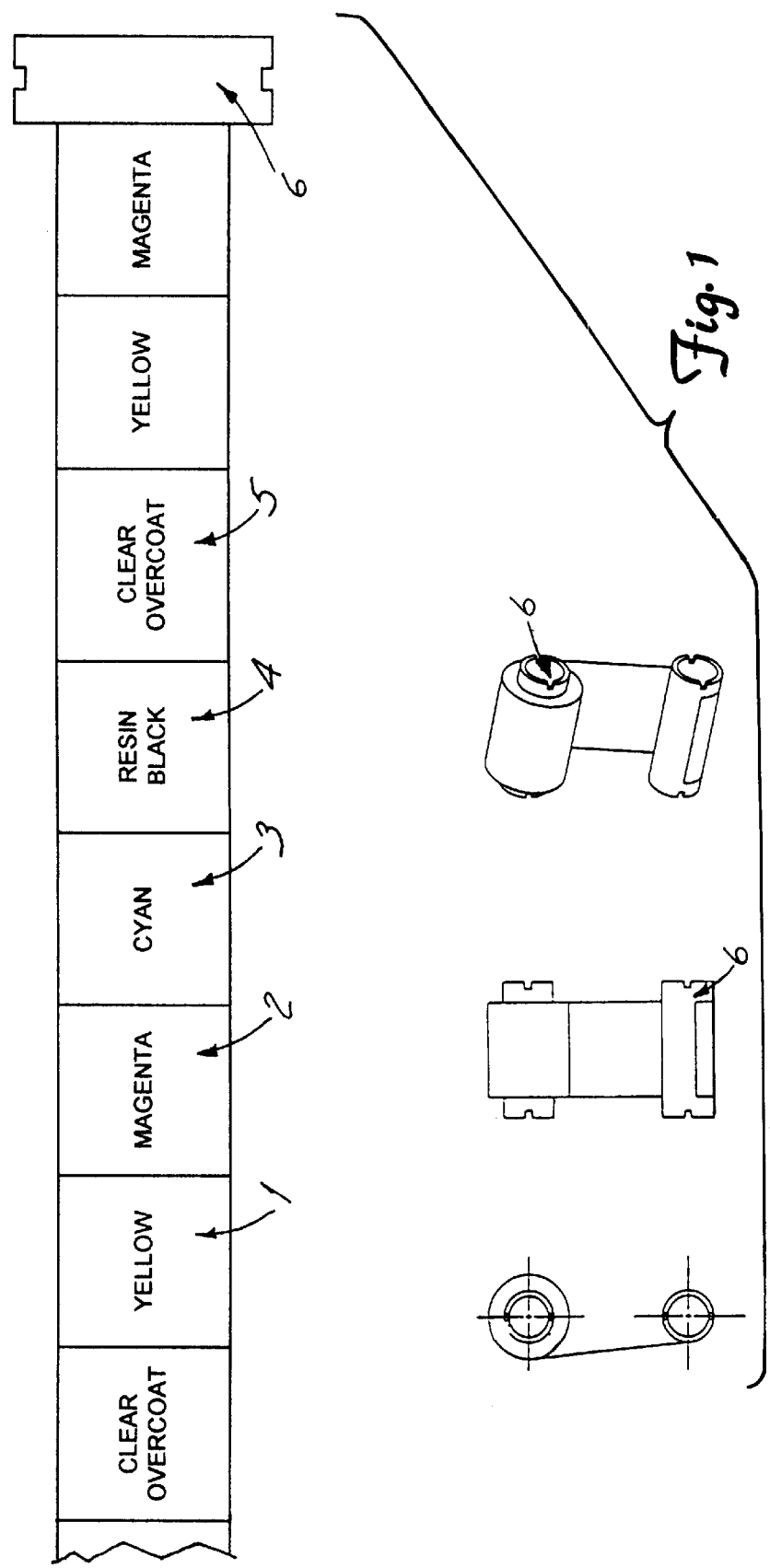
FIG. 1 is a plan view showing panels on a ribbon for use with the present invention.

The present invention includes a process that prints a clear layer or layers over a YMCK composite printer layer on an identification card by using the overlayers as a printable surface. These overlayer panels (OP) are known in dye sublimation printing. They are typically used to protect the dyes that have been sublimated into a substrate from UV degradation. Because the OP has an UV blocking component which causes the OP layer to fluoresce in UV light, when a pattern printed in the OP layer is bathed in UV light, the entire printed pattern (whether a logo, writing or other computer generated design) will fluoresce. Different OP layers have different formations for UV protection. Ribbons with OP layers are available from Dai Nippon of Tokyo, Japan have characteristics ranging from brightly fluorescent to absorbent. Combining more than one OP layer would give the fluorescing printing changes in intensity and hue.

If the OP layer or layers are used for printing images rather than laid down on the identification card as a full sheet, the sublimated dye not covered by the image would be unprotected against UV degradation. Since the OP layers themselves are very thin, even with the OP layer being laid down on the card as a full sheet, the durability of the image is problematic. Additional overlaminate material can be laminated onto the card, increasing the durability and longevity of the card. This second overlaminate material can be the holographic material or clear material such as PolyGuard (sold by FARGO Electronics, Inc. of Eden Prairie, Minn.).

If the OP layer is printed over the dye or resin, it does not sublimate into the card but sits on top of the card. When the second overlaminate material is laminated on top of the image printed on the OP layer, a series of ridges with refracting angles are created by the printed image of the OP layer underneath the second overlaminate. By modulating the printed pattern at a high frequency, this process can create something similar to a diffractive grating where sharp angles are embossed into the reflective surface to create more refractive angles to refract light. In one form, the process causes the printed edges to refract the light so that angling the card from a light source will bring the outline of the clear printed image into view when the angle of the refracted light aligns with the viewer.

When more printed OP layers are used, then one OP layer can be used to protect the YMCK dye printing and the additional OP layer can be used for security imaging. By putting more OP layers on the card, especially when the OP layers have different refractive properties or different UV absorbing or fluorescing properties, additional security features can be devised.

The overlaminate, which is laminated onto the identification card in a second step, can be scored by the laminating print head of the identification card printer. This scoring would take the form of reflectively compatible angle grooves. Each groove further enhances the OP layer's refractive properties, creating a diffraction grating like image to appear as the card is moved away from a horizontal plane and light reflects accordingly.

The diffraction grating type image which previously had to be embossed into the overlaminates now can be simulated by printing the OP layers and using the second overlaminate which will reduce costs, time to manufacture, and enable accurate targeting of the image. In addition, if the printed overlaminate is modulated by either printing or special overlaminate manufacturing, more reflective edges are created to enhance the security image.

Figure 2:
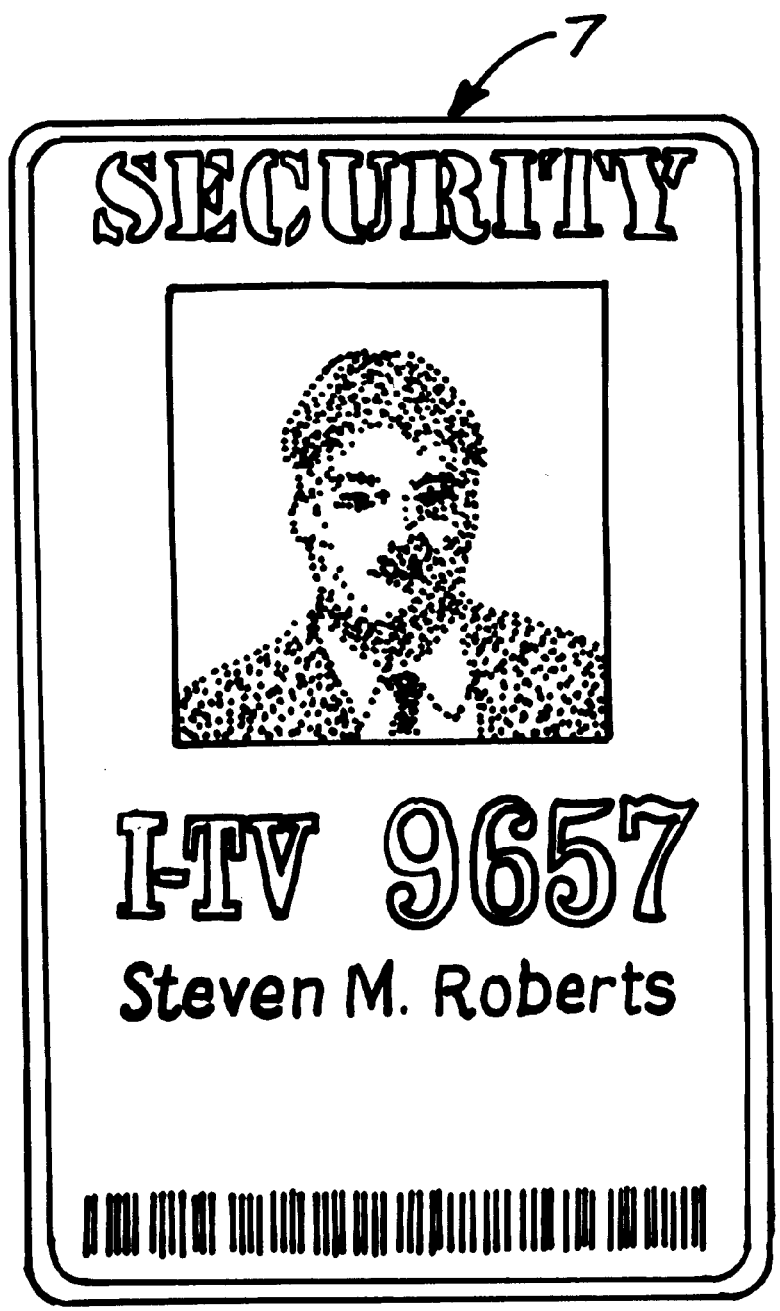
FIG. 2 is a plan view of an identification card.

Identification card ribbons (FIG. 1) consist of a series of panels (in the case of FIG. 1, consisting of yellow dye (1), cyan dye (2), magenta dye (3), black resin or black dye (4), and a clear overlaminate (5) thus being known as a "YMCKO" ribbon, each of which are coated with dye sublimation ink or resin ink. Each ribbon can be configured with different ink panels depending on the specifications desired. Thus, the ribbon in FIG. 1 could eliminate the black resin panel, thus becoming a "YMCO" ribbon, or the overlaminate could be eliminated, thus becoming a "YMCK" ribbon. All combinations of ribbons that are able to print in full color require the yellow, cyan, and magenta panels. The ribbons are rolled onto circular cores (6) which fit into the printer. The ribbon is situated between the print head and the blank identification card. The printer then receives instructions from a computer that is connected to printer as to the digital images and heating instructions to heat the print head to place such images onto the identification card (7) (FIG. 2).

FIG. 3 shows the carrier ribbon (8) and the overlaminate material (9). The overlaminate material is designed so that it would completely cover an identification card when heat from the print head is applied to the entire overlaminate material. The overlaminate has a laminating material coated on the exposed side (which is face down when run through the printing process) of the laminate. When heat is applied, this coating material bonds the lamination material and the identification card together.

FIG. 5 shows the process of laminating. The ribbon core (6) has been mounted onto the core holder (12) and the ribbon (13) has been pulled through the print head mounting assembly (14) and is pinched between the print head (15) and the identification card (7), which is held tightly by a pinch roller (16). The used ribbon is re-wrapped around a take up roll (not shown). The identification card is fed into the printer by a series of pinch rollers (17) from an input hopper (not shown). The identification card (7) moves with the ribbon panel, and then is pulled in the reverse direction from which it was fed to have the next panel printed upon it. Thus the card moves forward and backwards depending upon its location and the ribbon panel location. The pinch rollers are capable of moving bi-directionally while the print head and print head mechanism remain stationary. Once printed and laminated, the identification card is moved from the print head area by a series of pinch rollers (18).

Figure 4A:
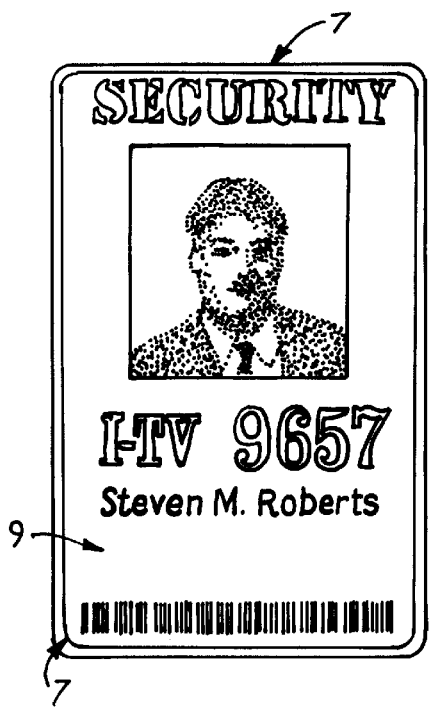
FIG. 4A is a top plan view of an identification card including an overlaminate layer.
Figure 4B:
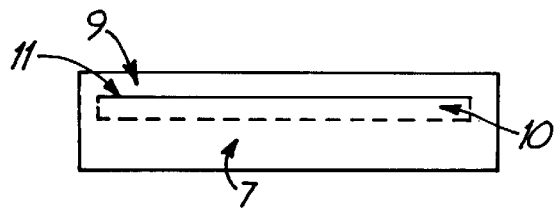
FIG. 4B is a side cross-sectional view of the identification card of FIG. 4A.

In FIGS. 4A through 4D, the results of the bonding can be seen. The identification card (7) has been printed on, and the overlaminate layer (9) has been applied over the full length and width of the identification card. FIG. 4B is a cross-section of the bonded identification card (7). The overlaminate (9) cove's the entire width of the identification card. If the cross-section was lengthwise rather than through the width of the card, the overlaminate would stretch the entire length of the card. The clear feature of the overlaminate allows the printing on the card to be completely visible. The dye sublimation (10) have sublimated into the card, remaining below the surface of the identification card (11) so that the surface is still flat until the overlayer is applied. When and where the overlayer is applied, the card's thickness is increased. Resin ink sits on top of the surface and also provides ridges.

Figure 4C:
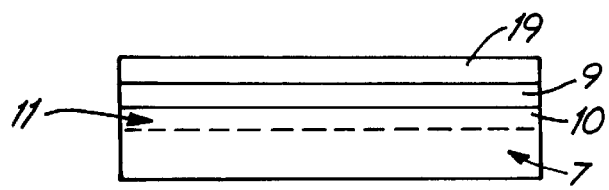
FIG. 4C is a side cross-sectional view of the identification card of FIG. 4A including a second overlaminate layer.

The overlayer can be supplemented with an additional lamination at a separate station. Identification card printers such as the Cheetah II or the Pro-L (available from Fargo Electronics, Inc. of Eden Prairie, Minn.) incorporate a second lamination station for an overlaminate that is thicker and more durable than the overlaminate layer applied at the printing station. This thicker and more durable overlaminate such as PolyGuard sold by FARGO is on a separate roll from the YMCKO ribbon. These overlaminates are suitable for having a holographic type image embossed therein. In FIG. 4C, the results of applying the thicker overlaminate can be seen. The identification card (7) has the sublimated dyes or resins (10) which have become part of the card. The overlaminate layer (9) has been laid down in a full sheet to cover the entire card, and the thicker overlaminate layer (19) has been laminated on top of the first overlaminate to create a sandwich effect.

Figure 4D:
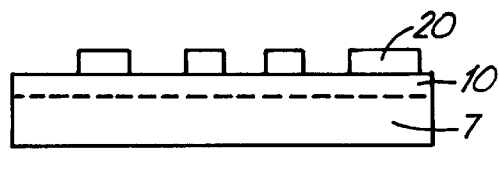
FIG. 4D is a cross-sectional view of an identification card including a pattern formed using a overlaminate in accordance with the present invention.
Figure 4E:
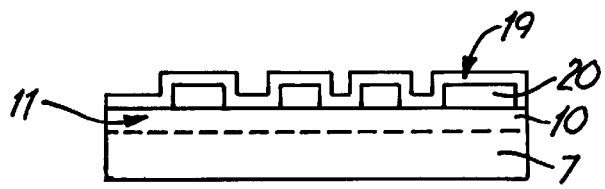
FIG. 4E is a side cross-sectional view of the identification card of FIG. 4D following deposition of a second overlaminate layer.

In FIG. 6, the overlayer panel (9) is printed on (20), rather than being laid down as a full sheet. The printed image can be any graphic image created on a computer FIG. 4D shows the cross-section of the card (7) with the overlayer (20) being printed as a clear printed layer rather than as an unbroken sheet. When the thicker overlayer (19) is applied in FIG. 4E, the effect is to create ridges on the thicker overlaminate sheet rather than a smooth surface as was shown in FIG. 4C. When these ridges are created, light reflects from the edges of the underlying overlaminate (20) creating a ghosting image when the card is moved from a horizontal plane.

In some cases, application of the overlaminate is not a viable option because of the cost of the overlaminate and the price of the printer required to laminate the card. In that case, a similar methodology can be utilized that achieves a similar result. In FIG. 6, the overlay materials is laid down as a first pass, with the heavier overlaminate materials being applied in the second operation, utilizing a hot roller. To achieve a similar result, the first thin overlaminate is applied in reverse, i.e., the entire overlaminate panel is applied except for the image. Instead of a raised surface on the card, the image is actually lower than the overlay material on the card. The ridges that are created are inverted, sot hat the eye can still see the image, since the image is the area where the overlay was not printed. Since there is no overlaminate coating in this embodiment, the image can be seen, otherwise the application of the second, heavier overlaminate would cover and fill in the nonprinted area. Since the non printed area has no protection from UV rays, over time the image (as this is the non printed area) will appear since the dye sublimation inks will fade from exposure to UV light.

Although the present invention has been described with reference to preferred embodiments, workers skilled in the art will recognize that changes may be made in form and detail without departing from the spirit and scope of the invention. For example, other types of overlaminate, over lamination techniques, or techniques for creating ridges in an overlaminate layer can be sued when implementing the present invention. For simplicity, a preferred species is disclosed. However, the invention includes the gnus and the invention should not be limited to any particular species when interpreting broad steps or elements of the invention.

What is claimed is:

1. A method for printing an identification card, comprising:
    printing an image on a substantially flat surface of the identification card;
    depositing a first overlayer on the surface of the identification card;
    creating ridges in the first overlayer on the substantially flat subsequent to the step of depositing the first layer; and
    depositing a second overlaminate layer over the first overlayer subsequent to the step of creating ridges, the second laminate layer having ridges created by the ridges in the first overlayer;
    wherein the ridges create a visible pattern on the identification card.

2. The method of claim 1 wherein the visible pattern is created by refraction of light.

3. The method of claim 1 wherein the visible pattern is created by the reflection of light.

4. The method of claim 1 wherein the visible pattern is created by the refraction and reflection of light.

5. The method of claim 1 wherein the ridges in the first overlayer are created by selectively depositing a pattern to form the ridges during the step of depositing the first overlayer.

6. The method of claim 1 wherein the ridges in the first overlayer are created by scoring the first overlayer.

7. The method of claim 1 wherein the step of printing is performed prior to the step of depositing the first overlayer.

8. The method of claim 1 wherein the step of printing is performed subsequent to the step of depositing the first overlayer.

9. The method of claim 1 wherein the step of printing comprises dye sublimation printing.

10. The method of claim 1 wherein depositing the first overlayer comprises transferring a laminate panel from a ribbon onto the surface of the identification card.

11. The method of claim 10 wherein the ribbon comprises a YMCKO ribbon.

12. The method of claim 10 wherein the ribbon comprises a YMCO ribbon.

13. The method of claim 1 wherein the first overlayer absorbs ultraviolet radiation and whereby the pattern is visible when the identification card is exposed to ultraviolet radiation.

14. The method of claim 1 wherein the first overlayer fluoresces in response to ultraviolet radiation and whereby the pattern is visible when the identification card is exposed to ultraviolet radiation.

15. An identification card printer implementing the method of claim 1.

16. The method of claim 6 wherein the scoring is performing with a printhead.

* * * * *

UNITED STATES PATENT AND TRADEMARK OFFICE
CERTIFICATE OF CORRECTION

PATENT NO. : 6,146,032
DATED : November 14, 2000
INVENTOR(S) : Matthew K. Dunham Page 1 of 1

It is certified that error appears in the above-identified patent and that said Letters Patent is hereby corrected as shown below:

Col. 5, line 16, after "flat" insert --surface--.

Signed and Sealed this

Fifth Day of June, 2001

Attest:

*Attesting Officer*

NICHOLAS P. GODICI

*Acting Director of the United States Patent and Trademark Office*